United States Patent
Snider

(10) Patent No.: US 9,031,538 B2
(45) Date of Patent: *May 12, 2015

(54) METHOD AND APPARATUS TO DETERMINE IF A CELLULAR JAMMING SIGNAL IS MALICIOUS OR NON-MALICIOUS BASED ON RECEIVED SIGNAL STRENGTH

(75) Inventor: James Snider, Kildeer, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,758

(22) Filed: Feb. 16, 2012

(65) Prior Publication Data

US 2013/0217358 A1    Aug. 22, 2013

(51) Int. Cl.
| | |
|---|---|
| H04M 1/66 | (2006.01) |
| H04W 12/12 | (2009.01) |
| H04W 4/04 | (2009.01) |
| H04W 24/08 | (2009.01) |
| H04W 48/12 | (2009.01) |
| H04W 48/16 | (2009.01) |

(52) U.S. Cl.
CPC ............... *H04W 12/12* (2013.01); *H04W 4/04* (2013.01); *H04W 24/08* (2013.01); *H04W 48/12* (2013.01); *H04W 48/16* (2013.01)

(58) Field of Classification Search
USPC ............ 455/411, 575.9, 569.2, 404.2; 342/20
See application file for complete search history.

(56) References Cited

U.S. PATENT DOCUMENTS

| | | | |
|---|---|---|---|
| 3,961,323 A | 6/1976 | Hartkorn | |
| 5,239,667 A * | 8/1993 | Kanai | 455/10 |
| 5,895,436 A | 4/1999 | Savoie et al. | |
| 6,201,493 B1 * | 3/2001 | Silverman | 342/20 |
| 6,229,998 B1 * | 5/2001 | Hamdy et al. | 455/226.1 |
| 6,330,438 B1 | 12/2001 | McClelland et al. | |
| 6,448,925 B1 | 9/2002 | Shridhara | |
| 6,803,861 B2 | 10/2004 | Flick | |
| 2002/0014978 A1 | 2/2002 | Flick | |
| 2002/0163906 A1 | 11/2002 | Diachina et al. | |
| 2003/0222813 A1 * | 12/2003 | Boulay et al. | 342/159 |
| 2004/0005858 A1 | 1/2004 | Cervinka et al. | |
| 2004/0075539 A1 | 4/2004 | Savoie et al. | |
| 2005/0090952 A1 | 4/2005 | Boulay et al. | |
| 2006/0007039 A1 | 1/2006 | Duvall | |

(Continued)

FOREIGN PATENT DOCUMENTS

| | | |
|---|---|---|
| DE | 10009488 A1 | 11/2000 |
| DE | 102004048668 A1 | 4/2006 |

(Continued)

OTHER PUBLICATIONS

Search Report dated Jun. 20, 2012, from corresponding GB Patent Application No. 1205181.9.

(Continued)

*Primary Examiner* — Patrick Edouard
*Assistant Examiner* — Chuck Huynh

(57) ABSTRACT

A signal on a wireless communication system control channel can be identified as authentic or malicious by monitoring control channel signal strength changes. When a control channel signal level increases abnormally fast or too quickly, i.e., above a threshold value rate of increase, the control channel signal is identified as likely being from a malicious source, such as a jamming transmitter.

18 Claims, 3 Drawing Sheets

(56) References Cited

U.S. PATENT DOCUMENTS

| | | |
|---|---|---|
| 2006/0267744 A1 | 11/2006 | Baumgartner et al. |
| 2007/0049323 A1 | 3/2007 | Wang et al. |
| 2007/0079376 A1 | 4/2007 | Robert et al. |
| 2007/0200688 A1 | 8/2007 | Tang et al. |
| 2008/0095058 A1* | 4/2008 | Dalmases et al. ............ 370/237 |
| 2008/0186932 A1 | 8/2008 | Do et al. |

FOREIGN PATENT DOCUMENTS

| | | |
|---|---|---|
| EP | 0167442 A2 | 1/1986 |
| EP | 1362753 A1 | 11/2003 |
| EP | 1363421 A2 | 11/2003 |
| EP | 1514444 A1 | 3/2005 |
| EP | 1593564 A1 | 11/2005 |
| EP | 1809057 A1 | 7/2007 |
| EP | 2003818 A1 | 12/2008 |
| EP | 2124428 A1 | 11/2009 |
| GB | 2296843 A | 7/1996 |
| GB | 2317418 A | 3/1998 |
| GB | 2407455 A | 4/2005 |
| GB | 2435987 A | 9/2007 |
| GB | 2445046 A | 6/2008 |
| GB | 2457102 A | 8/2009 |
| WO | 95/33214 A1 | 12/1995 |
| WO | 96/04155 A1 | 2/1996 |
| WO | 00/21053 A1 | 4/2000 |
| WO | 01/32481 A1 | 5/2001 |
| WO | WO01/31797 A1 | 5/2001 |
| WO | 03/103322 A1 | 12/2003 |
| WO | 2005/112321 A1 | 11/2005 |
| WO | 2006/092737 | 9/2006 |
| WO | 2007/019814 A1 | 2/2007 |
| WO | 2008/111001 A2 | 9/2008 |
| WO | 2011/084493 A1 | 7/2011 |
| WO | 2011/084601 A1 | 7/2011 |
| WO | 2011/084617 A1 | 7/2011 |

OTHER PUBLICATIONS

M. Mouly; M-B Pautet, "Mobility and Security Management" GSM System for Mobile Communications, Jan. 1, 1993, pp. 432-498, Europe Media, Lassay-Les-Chateaux, France.

* cited by examiner

METHOD AND APPARATUS TO DETERMINE IF A CELLULAR JAMMING SIGNAL IS MALICIOUS OR NON-MALICIOUS BASED ON RECEIVED SIGNAL STRENGTH

BACKGROUND

Some vehicles are now equipped with anti-theft devices comprised of cellular telephone systems configured to transmit an emergency message when various sensors on the vehicle are triggered by events that usually accompany a collision or the vehicle's theft. These so-called stolen vehicle transmitter (SVT) devices are an effective theft deterrent because when provided with a global positioning system (GPS), they are also able to broadcast the location of the vehicle after it is stolen using location information obtained from the GPS.

Skillful car thieves are nevertheless able to steal a vehicle equipped with an SVT transmitter by jamming the control channel of a cellular telephone system with which the SVT is associated. While control channel jamming transmitters are unlawful, at least inside the United States, they can be purchased via the Internet. By jamming the control channel with a jamming transmitter, a vehicle's SVT is unable to request a frequency on which it can transmit an emergency message.

Techniques exist that can overcome control signal jamming but the use of those techniques can cause other problems if a spurious control channel signal is not from a car thief's jamming transmitter. Some businesses are known to employ control channel jammers in order to prevent customers from using cell phones on their premises. If a business maintains a cell phone control channel jammer, to prevent cell phones from being used, a vehicle anti-theft system that "hears" such a jamming signal will usually mistake such a jamming signal as a theft attempt and attempt to overcome the jamming signal. When a telematics service provider receives a signal from a SVT that indicates a vehicle is being stolen, the attention of law enforcement agencies will be needlessly diverted.

BRIEF SUMMARY

A signal on a wireless communication system control channel can be identified as authentic or malicious by monitoring control channel signal strength changes. When a control channel signal level increases abnormally fast or too quickly, i.e., above a threshold value rate of increase, the control channel signal is identified as likely being from a malicious source, such as a jamming transmitter.

DETAILED DESCRIPTION

Figure 1:
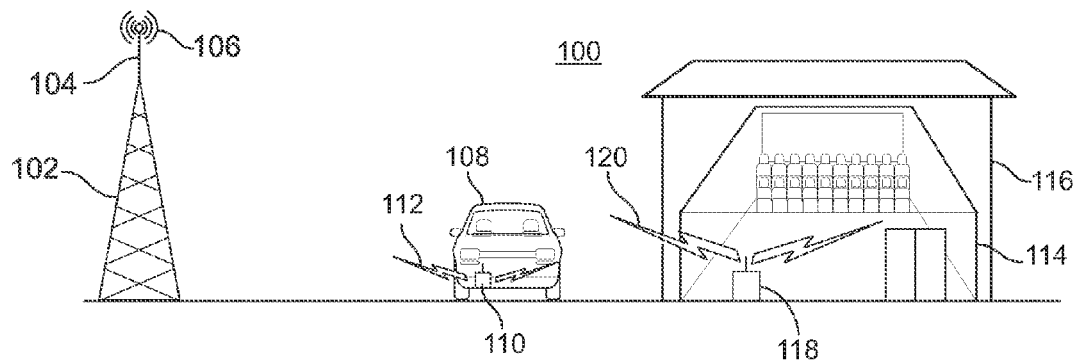
FIG. 1 depicts a vehicle equipped with a stolen vehicle transmitter or SVT within range of a control channel jamming transmitter installed in a business.

FIG. 1 depicts a wireless communication system 100. The system 100 is comprised of a conventional cell site tower 102 having a conventional cell site antenna 104 from which conventional control channel signals 106 are transmitted. The control channel signals 106 are well known in the prior art. They control the operation of the cellular telephones, also known as wireless communications devices, within the signal range of the signal 106.

The system depicted in FIG. 1 includes an automobile 108 equipped with a stolen vehicle transmitter 110 or SVT 110. The SVT 110 is typically installed at the time of the vehicle's manufacture but can be installed in the vehicle 108 as an after-market add on. The SVT 110 is configured to broadcast an emergency message 112 when one or more various kinds of sensors on the car 108 are actuated. Such sensors are usually activated when the vehicle 108 is involved in a collision or while the vehicle is being stolen. Sensors on the vehicle can include but are limited to an inclinometer, glass-breakage sensor or electrical signals sent into an engine control unit that overcomes other vehicle security systems not shown.

The car 108 is depicted in FIG. 1 as being parked adjacent to a business 114 in a building 116. The building 116 is depicted as having within in it, a control channel jamming transmitter 118.

The control channel jamming transmitter 118 is designed and configured to transmit white noise or other spurious signals on one or more control channels used by wireless communications systems. The jamming signal 120 of course is configured to "jam" or overpower the authentic or genuine control channel signal broadcast from a cell site, including the signal 106 from the antenna 104 atop the tower 102.

Many SVTs are designed to recognize a jamming signal on a control channel and effectuate jamming signal countermeasures. Unfortunately, a jamming signal 120 emitted from a jamming transmitter used by someone in a fixed location, will also be identified as a malicious jamming signal, triggering the transmission of countermeasures. Stated another way, if the SVT 110 in the vehicle 108 detects the signal 120 from the control channel jamming transmitter 118 in the building 116 as malicious, the SVT 110 will needlessly execute countermeasures that usually require a response from law enforcement agencies.

Many cellular or wireless communications system radios are able to evaluate the relative strength of received radio frequency signals. The relative strength of a received signal is represented in the radios by a signal known as a received signal strength indicator or RSSI.

Figure 2A:
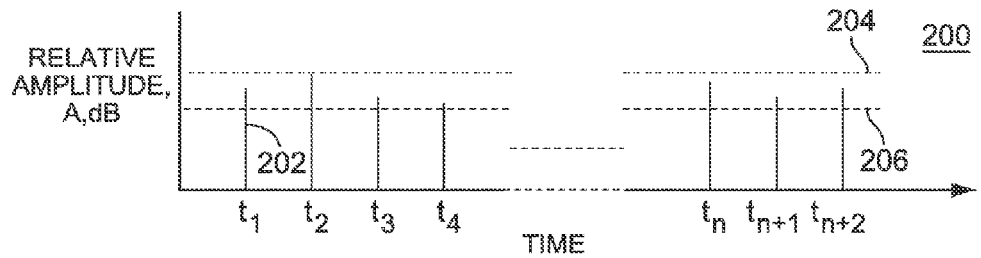
FIGS. 2A, 2B and 2C are depictions of control channel signal strength indicators over time.

FIG. 2A is a graphical depiction of a series of consecutive RSSI values 202 and their relative amplitudes, A, expressed in decibels (dB). In FIG. 2A, the relative amplitude of several, temporally-consecutive RSSI values 202 are located at successive time intervals denominated as $t_1$, t2 through $tn_{+2}$. As can be seen in the figure, the RSSI values have a relatively consistent amplitude between an upper limit 204 and a lower limit 206 for all of the samples at as $t_1$, t2 through $t_{n+2}$. The depiction of RSSI values in FIG. 2A thus represents RSSI values from the RF receiver of a wireless communications device as the device moves around a wireless communication system.

Figure 2B:
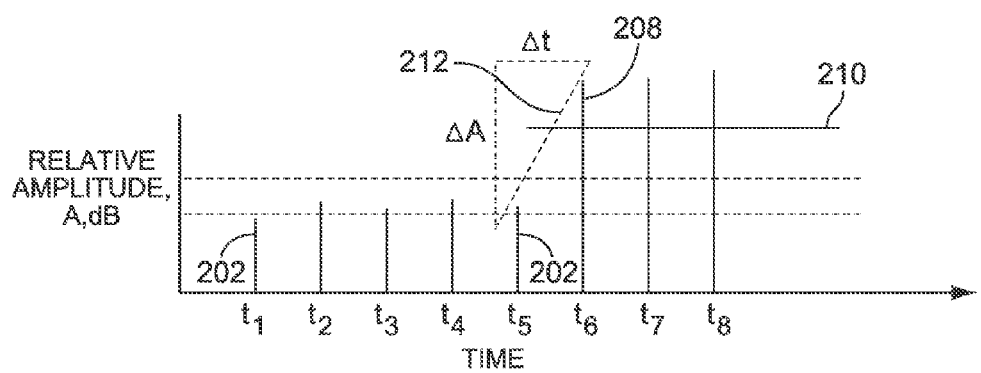

FIG. 2B is another graphical depiction of a series of consecutive RSSI values 202 and their relative amplitudes, A, expressed in decibels (dB). In FIG. 2B, the relative amplitude of several, temporally-consecutive RSSI values 202 are located at successive time intervals denominated as $t_1$, t2 through $t_{n+2}$ but the relative amplitude, A of the RSSI value obtained at $t_6$ is significantly greater than the previous RSSI sample 208 at $t_5$. A RSSI increase over 3 decibels or dB is considered herein to be strongly indicative of the nearby presence or usage of a control channel jamming transmitter.

When the difference between the amplitude of the samples taken at $t_6$ and $t_5$ is divided by the time between those successive samples, the rate of RSSI amplitude change can be expressed as the slope or gradient of a line 212 connecting the two sample values. The slope of the line 212 between those two values is rise or increase in signal amplitude from $t_5$ to $t_6$ divided by the time between those two successive samples. As depicted in FIG. 2B, the slope or gradient of the line 212 is steep, indicating a nearly instantaneous signal increase, as happens when a control channel jamming transmitter, located proximate to an SVT, is activated. A typical example of a gradient often caused by a jamming transmitter is 3 dB per second.

Figure 2C:
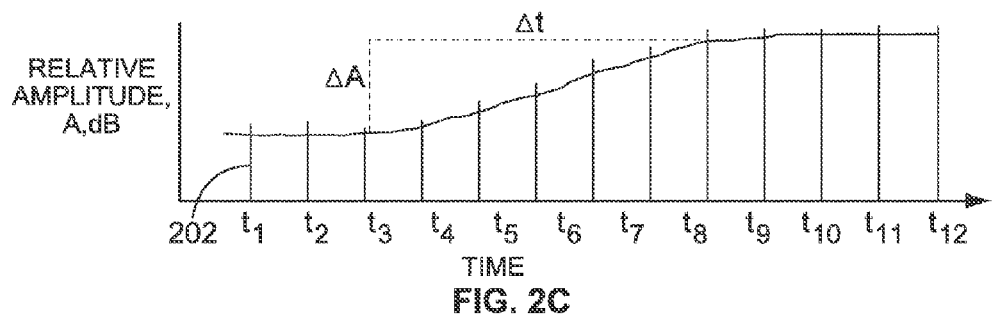

FIG. 2C is a plot of RSSI values 202 that show RSSI values increasing slowly over the time between $t_3$ and $t_9$. The gradual increase of those RSSI values between $t_3$ and $t_9$ is representative of the control channel signal level increase that would be seen when the SVT approaches a control channel transmitter or when a control channel transmitter approaches an SVT. The relatively slow and gradual increase of the RSSI signal levels over a relatively long period of time suggests or indicates that the increase in RSSI signal level is not a malicious jamming signal but instead fixed at a specific location. The rate of control channel signal level increase between $t_3$ and $t_9$ of FIG. 2C, is significantly less than the rate of control channel signal level increase between $t_5$ and $t_6$ shown in FIG. 2B. The rate of change or the gradient of the "line" defined by the RSSI signal level of FIG. 3, increases over a much longer period of time and thus indicates that the control channel signal is likely to be fixed and unlikely to be malicious, i.e., a jamming signal from a car thief.

Figure 3:
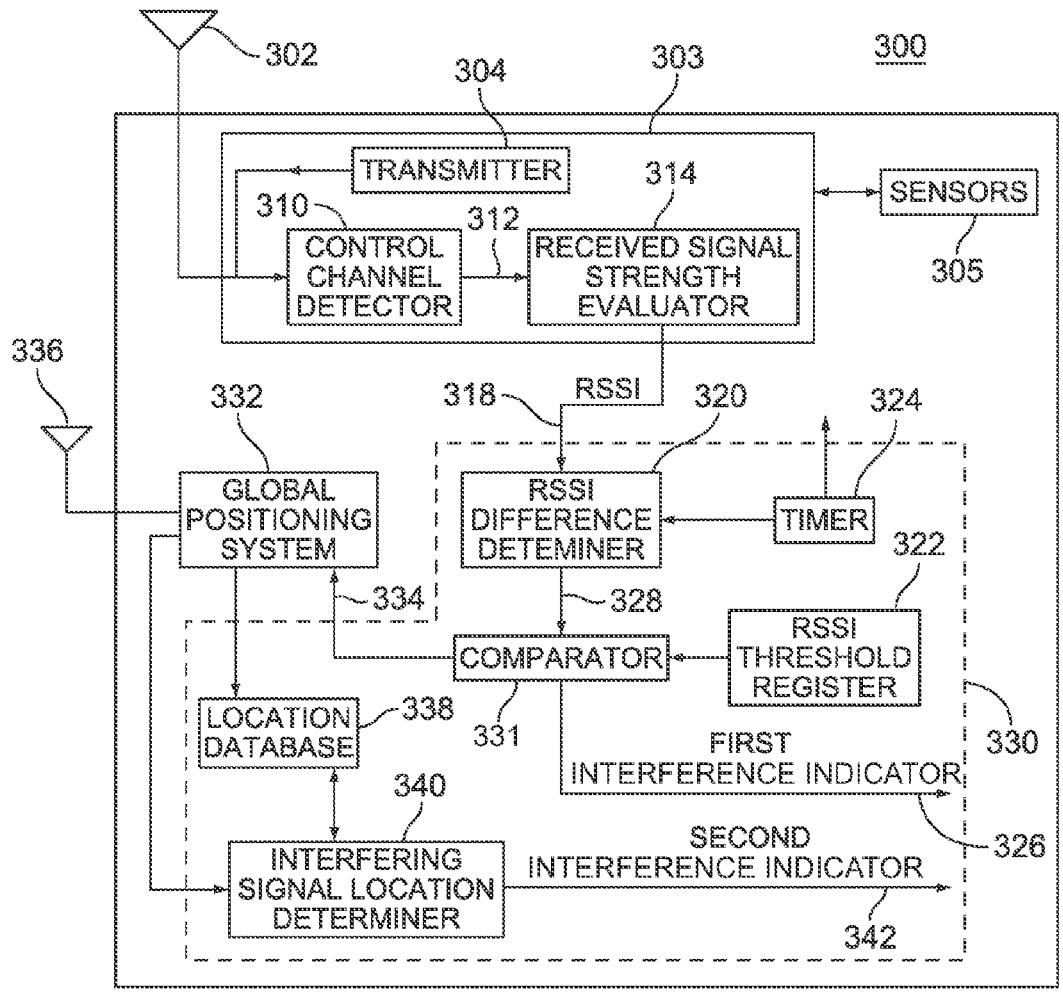
FIG. 3 is a block diagram of a stolen vehicle transmitter.

FIG. 3 is a block diagram of a stolen vehicle transmitter system 300 configured to determine whether a signal on a control channel for a wireless communication system is authentic or spurious. The SVT 300 is comprised of an antenna 302, which picks up radio frequency signals of a wireless communication system. A wireless communications system transceiver 303 comprised of a transmitter 305 and a receiver provide the ability to send alarm signals to a telematics service provider when one or more sensors 305 in a vehicle are actuated. The alarm signals are transmitted by the transmitter 304.

The transceiver 303 is also able to receive signals and, for purposes of this disclosure, signals on a wireless communications control channel are "received" or detected by a control channel detector 310. The control channel detector 310 receives control channel signals from the transceiver and decodes them.

The control channel signals 312 output from the control channel detector 310 are provided to a "received signal strength evaluator" 314. The received signal strength evaluator 314 measures the relative strength, also known as the relative amplitude of radio frequency (RF) signals on the control channel picked up by the antenna 302. The output of the received signal strength evaluator 314 is a received signal strength indicator 318 or "RSSI."

The RSSI 318 is preferably embodied as a digital, numeric value corresponding the relative strength of the signal received or picked up by the antenna 302 at a specific instant in time. As shown in FIG. 2A, 2B and 2C, the amplitude of the RSSI 318 changes as the SVT 200 moves from place to place or when the control channel used by the SVT is jammed.

The RSSI 318 is provided to an RSSI difference determiner 320. The RSSI difference determiner 320 has different embodiments. In the first embodiment, the RSSI difference determiner 320 receives two successive RSSI values 318 and computes the difference between them, such as the relative amplitude values obtained at $t_5$ and $t_6$ of FIG. 2B.

The difference between two successive RSSI values calculated by the RSSI difference determiner 320 is provided to an RSSI comparator 331. The RSSI comparator 331 compares the RSSI difference that was computed by the difference determiner 320, to an RSSI threshold value, such as 3 dB, stored in a programmable or changeable RSSI threshold register 322. If the result of the comparison performed by the RSSI comparator 331 exceeds the threshold value stored in the threshold register 322, the comparator 331 outputs an interference indicator signal 326, the existence or value of which indicates that at least one of the two RSSI signals received by the difference determiner 320 are likely from a malicious source. By coupling the interference indicator signal 326 to the transceiver 303, jamming countermeasures can be initiated.

Signals on a wireless communications system control channel are evaluated continuously and frequently by circuitry in the transceiver and the circuits described above. A sudden or nearly instantaneous increase in the strength of a signal on the control channel usually indicates the presence of a control channel jamming transmitter being "keyed" or activated.

In a second embodiment, the RSSI difference determiner 320 is configured to "read" or evaluate several consecutive RSSI values 318 at corresponding instants of time, the sample times being determined by the timer 324. The relative amplitudes of a set of consecutive RSSI values is averaged. That average RSSI value, which is denominated herein as Average Value$_1$ is stored in a memory device within the RSSI difference determiner, while RSSI values for a second and subsequent set of consecutive RSSI values are averaged and that second average value Average Value$_2$ is stored in a second memory device. Stated another way, in the second embodiment, the RSSI difference determiner 320 computes a first average value of multiple, consecutive RSSI values and computes a second average value of multiple consecutive RSSI values. Once those two RSSI averages are computed, the RSSI difference determiner 320 calculates the difference between the two RSSI averages. That result is then provided to the RSSI comparator 331.

In the second embodiment, the comparator 331 is configured to compute the difference between the successive average RSSI values, Average Value$_2$ and Average Value$_1$. If the difference between the those two RSSI averages exceeds a threshold value stored that is also stored in the RSSI threshold register 322, the comparator outputs an interference indicator signal 326, which as described above, identifies a sudden increase in a control channel signal as likely being caused by a car thief's jamming transmitter.

In yet a third embodiment, the RSSI difference determiner 220 is configured to determine or calculate differences between successive RSSI values over a period of time and to compute a rate of change for the successive RSSI values. In one such embodiment, the RSSI difference determiner 220 calculates a difference between first and second RSSI values. It thereafter calculates the difference between the second and a third received RSSI value. Thereafter it computes the difference between the third and a fourth RSSI value and so on. The successive differences between several RSSI values define corresponding gradients between each sample, or an average gradient for several samples. A substantially instantaneous increase in the control channel signal level can be identified by determining whether the gradient between of two or more RSSI values exceeds a threshold value stored in the RSSI threshold register 222. An increase of more than 3 dB per second is considered to be indicative of the presence or usage of a jamming transmitter.

Those of ordinary skill in the art will recognize that a control channel jamming transmitter 118 can be configured to transmit signals on a control channel frequency that are comprised of data signals similar to or reminiscent of legitimate or authentic data signals ordinarily broadcast on a wireless communication control channel. In another embodiment, the jamming transmitter 118 can transmit white noise of the control channel at an amplitude or power level great enough to saturate an RF preamp 204 or otherwise overcome authentic signals 106 transmitted from a cell phone tower.

Because of the possibility that a jamming transmitter might transmit white noise as well as data, the control channel detector 310 is configured to recognize white noise as a control channel signal having a signal strength or level and which is represented by an RSSI value 318.

In a preferred embodiment, the RSSI threshold register 322 is programmable. The values stored therein can be changed "on the fly" by a processor responsive to changing conditions in the network or the control channel signal levels generally.

The functionality provided by the RSSI difference determiner 320, the timer 324, the RSSI threshold register 322 and the comparator 331 can be provided by conventional logic devices, i.e., combinational and sequential logic circuits. They can also be realized by a processor coupled to a memory device that stores program instructions, which when executed cause the processor to perform the functions described above and attributed to each of the structural elements enclosed within the area bounded by the broken line identified by reference numeral 330. Digital signal processors (DSPs), microprocessors and so-called microcontrollers are considered to be equivalent embodiments of processors that are able to perform the functions associated with the devices depicted in the figures.

Still referring to FIG. 3, the SVT 300 is provided with a global positioning system or "GPS" 332. The SVT 300 is also provided with a location data base 338 that contains a list of locations of known control channel jamming transmitters, examples of which would include theatres or churches, the owners of which operate a control channel jamming transmitter. The database can also be populated with locations having various characteristics, which indicate a likely usage of a control channel jamming transmitter. Such characteristics can include the type or character of a neighborhood, a type of business or building, e.g., a theatre, casino or church.

The GPS 332 is configured to receive a trigger signal 334 from the comparator 331 upon the identification of an abnormal increase in the control channel signal level. Such a determination is made when the difference between successive RSSI signal values exceeds a threshold, or when the difference between averages of consecutive sets of RSSI values exceed a threshold value or, when the rate of increase of successive RSSI values is at a rate per unit time that exceeds a threshold, rate per unit time stored in a threshold register 322.

When a determination is made that a control channel signal level increase is abnormal, the location trigger signal 334 sent to the global positioning system 332 signals the GPS system 332 to determine its then-current location using signals that it receives from its own antenna 236. When the GPS 332 determines its location responsive to the reception of the trigger signal 334, the GPS 332 provides the current location to an "interfering signal location" determiner 340.

The interfering signal location determiner 340 is a device which accesses a location database 338 and which compares the current location, as determined by the GPS 332 to locations in the database 338. If the current location of the SVT 300 is not coincident with or proximate to a location listed in the database 338, the interfering signal location determiner 342 outputs an interference indicator signal 342. The interference indicator signal 342 indicates that a sudden increase in the level of signal on the control channel is likely due to a malicious control channel jamming transmitter most of which are operated by car thieves.

The location database 338 and the interfering signal location determiner 340 can be implemented with logic devices or a processor and an associated memory with program instructions executable by the processor. The elements enclosed by the broken line indentified by 330 are thus some of the functions that can be performed under software control.

Figure 4:
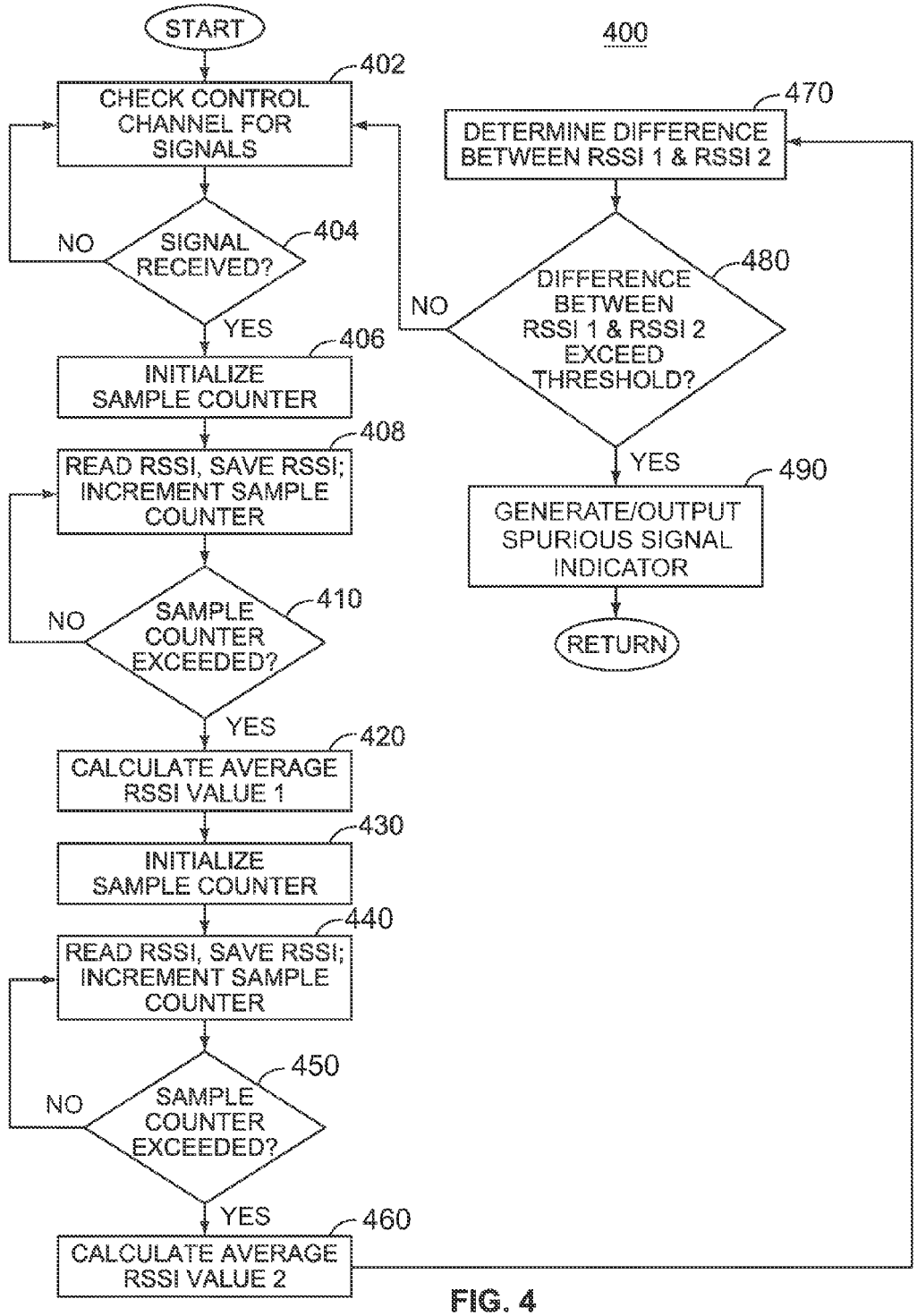
FIG. 4 is a flowchart of a method depicting steps for determining whether a signal on a control channel is authentic or spurious.

FIG. 4 depicts steps of a method 400 for determining whether a signal on a wireless communication system control channel is authentic. The method 400 effectively begins at step 402 where the control channel is scanned for signals. If no signal is received, the method 400 continuously loops from step 402 through step 404 until a recoverable signal is received on the control channel.

When a signal is received on a control channel, the method 400 proceeds to step 406 where an RSSI sample counter is initialized to a value corresponding to the number of RSSI signals that will be evaluated in subsequent steps. The value that the counter is initialized to is a design choice but needs to be at least one.

At step 408, the RSSI value output from the received signal strength evaluator 314 is saved in a memory location, the sample count is incremented and at step 410 a test is made whether the sample count has exceeded a threshold value above which additional RSSI samples will not be evaluated. From step 410 the method proceeds to step 420 where an average RSSI value is computed from the RSSI samples obtained in steps 406 through 410. That average RSSI value is stored in a memory location as the first average of a plurality of sequential RSSI values.

In step 430, a sample counter is initialized in order to collect a second set of consecutive RSSI values. The second set of RSSI values in accumulated by steps 440 and 450. When the sample count limit established in step 430 is realized, the method calculates an average RSSI value at step 460 from the samples collected in steps 430 through 450.

At step 470 the difference between the two average RSSI values is determined. If that difference exceeds a predetermined threshold, as determined at step 480, the second set of RSSI values indicates a substantially instantaneous increase in the RSSI value suggesting that a control channel jamming transmitter is in operation nearby. If the difference between the two average RSSI values is below the threshold the method returns to step 402 where the control channel is scanned again for signals and the foregoing process repeated.

If the difference between the average RSSI exceeds the threshold a spurious signal indicator is generated at step 490. The spurious signal indicator signal can be used by the SVT to initiate countermeasures to overcome the jamming transmitter detected by the sudden and unexpected increase in average RSSI values.

The foregoing description is for purposes of illustration only. The true scope of the invention is set forth in the appurtenant claims.

The invention claimed is:

1. A method of determining whether a signal received by a wireless communications transceiver in a vehicle on a wireless communication system control channel is authentic, the method comprising:

monitoring a control channel signal;

measuring the control channel signal level;
determining a rate of increase in the control channel signal level;
determining if the control channel signal level rate of increase exceeds a predetermined threshold;
after determining that the control channel signal level rate of increase exceeds the predetermined threshold, determining from a navigation system on the vehicle, a first location of the vehicle where the control channel signal level rate of increase exceeded said predetermined threshold;
determining from a jamming transmitter location database stored within the vehicle whether said first location is proximate to a location where a control channel signal jamming transmitters is known to be located; and
identifying the rate of increase in the control channel signal level as indicative of a control channel jamming signal when the rate of increase exceeds the predetermined threshold and when the first location of the vehicle is not proximate to a location where a control channel signal jamming transmitter is known to be located.

2. The method of claim 1, wherein the step of measuring the control channel signal level is comprised of:
periodically evaluating a received signal strength indicator (RSSI);
computing a first RSSI value at a first point in time;
computing a second RSSI value at a later, second point in time;
determining a difference between the first and second RSSI values;
determining the time between the first and second points in time; and
determining a rate of increase of the RSSI from the first and second RSSI values and the time between.

3. The method of claim 1, wherein the step of determining if the determined difference between the first and second RSSI values exceeds a threshold value, includes the step of:
determining whether differences between a plurality of successive RSSI values each exceed a predetermined threshold, which is changed on the fly, responsive to changing network conditions.

4. The method of claim 3, wherein successive differences between a plurality of RSSI values define a gradient and wherein the step of determining a substantially instantaneous increase in the control channel signal level comprises gradient above a threshold value.

5. The method of claim 1, wherein the step of measuring the control channel signal level is comprised of:
periodically evaluating a received signal strength indicator (RSSI);
computing a first average RSSI value from a first set of RSSI measurements;
computing a second average RSSI value from a second set of RSSI measurements; and
determining a difference between the first average RSSI and the second average RSSI values.

6. The method of claim 5, wherein the RSSI values comprising the first set of RSSI measurements and the RSSI values comprising the second set of RSSI measurements are different from each other.

7. The method of claim 5, wherein the step of determining a difference between the first average RSSI and the second average RSSI values includes the step of:
determining whether differences between a plurality of successive average RSSI values exceed a predetermine threshold.

8. The method of claim 5, wherein successive differences between a plurality of RSSI values define a gradient and wherein the step of determining a substantially instantaneous increase in the control channel signal level comprises gradient above a threshold value.

9. An apparatus for determining whether a signal on a control channel for a communications system used by a vehicle telematics system is authentic or spurious, the apparatus comprising:
a received signal strength determiner (determiner), configured to output a received signal strength indicator (RSSI) at specific points in time, each RSSI having a value corresponding to the strength of a signal received on the control channel by a receiver, at a corresponding point in time;
an RSSI comparator coupled to the determiner and configured to compare a plurality of successive RSSI values to a threshold signal increase value and configured to output a spurious signal indicator when a control channel signal strength rate of increase between successive RSSI values exceeds the threshold signal rate of increase value;
a global positioning system (GPS) coupled to the RSSI comparator and configured to determine a current location responsive to receipt of a spurious signal indicator;
a location database stored at the vehicle, coupled to the GPS and storing locations where control channel jamming transmitters are known to exist;
an interfering signal location determiner coupled to the location database and coupled to the GPS, the interfering signal location determiner being configured to determine from the location database and GPS whether the current location is proximate to a location where a control channel jamming transmitter is known to exist and additionally configured to output an interference signal indicating that a control channel signal level increase is due to jamming when the current location is not proximate to a location where a control channel jamming transmitter is known to exist.

10. The apparatus of claim 9, further comprising:
a control channel signal detector coupled to the determiner and configured to provide to the determiner, signals obtained from a control channel for the communications system.

11. The apparatus of claim 10, wherein the control channel signal detector is configured to recognize white noise as a control channel signal.

12. The apparatus of claim 11, wherein the signals obtained from a control channel are comprised of control channel jamming transmitter signals.

13. The apparatus of claim 9, further comprising a timer coupled to the determiner, the timer being configured to generate signals that identify specific points in time at which the determiner outputs a received signal strength indicator (RSSI).

14. The apparatus of claim 13, further comprising a programmable register coupled to the determiner and configured to provide at least one, threshold signal rate of increase value to the RSSI comparator.

15. The apparatus of claim 14, wherein the programmable register stores a value corresponding to a threshold rate of signal increase value, which value can be changed on the fly responsive to changing network conditions.

16. The apparatus of claim 9, further comprising a wireless transceiver, configured to provide a vehicle theft signal responsive to the spurious signal indicator.

17. The apparatus of claim 14, wherein at least one of the determiner, the timer and the RSSI comparator are comprised of a processor and an associated memory device.

18. The apparatus of claim 14, wherein the programmable register stores a value corresponding to a threshold rate of increase value of about three decibels per second.

* * * * *